(12) United States Patent
Aoyagi et al.

(10) Patent No.: US 11,490,005 B2
(45) Date of Patent: Nov. 1, 2022

(54) OVERHEAD LINE IMAGE CAPTURING SYSTEM AND OVERHEAD LINE IMAGE CAPTURING METHOD

(71) Applicant: Alpine Electronics, Inc., Tokyo (JP)

(72) Inventors: Shigeo Aoyagi, Iwaki (JP); Kenichiro Fujita, Iwaki (JP); Yosuke Tate, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 299 days.

(21) Appl. No.: 16/152,723

(22) Filed: Oct. 5, 2018

(65) Prior Publication Data
US 2019/0116309 A1    Apr. 18, 2019

(30) Foreign Application Priority Data
Oct. 13, 2017 (JP) ............... JP2017-199239

(51) Int. Cl.
*B64D 47/08* (2006.01)
*H04N 5/232* (2006.01)
*B64C 39/02* (2006.01)

(52) U.S. Cl.
CPC ....... *H04N 5/23218* (2018.08); *B64C 39/024* (2013.01); *B64D 47/08* (2013.01); *H04N 5/23299* (2018.08); *H04N 5/232061* (2018.08); *B64C 2201/027* (2013.01); *B64C 2201/108* (2013.01); *B64C 2201/127* (2013.01); *B64C 2201/146* (2013.01)

(58) Field of Classification Search
None
See application file for complete search history.

(56) References Cited

U.S. PATENT DOCUMENTS

| 9,162,753 | B1 | 10/2015 | Panto et al. |
| 9,753,461 | B1 | 9/2017 | Johnson et al. |
| 10,475,558 | B2 | 11/2019 | Dober |
| 10,708,617 | B2 | 7/2020 | Wu et al. |
| 2015/0353196 | A1 | 12/2015 | Van Cruyningen et al. |
| 2017/0244937 | A1* | 8/2017 | Meier ............... H04N 5/23216 |
| 2018/0032088 | A1* | 2/2018 | van Cruyningen ... B64C 39/024 |
| 2018/0246528 | A1* | 8/2018 | van Cruyningen ... B64C 39/024 |

(Continued)

FOREIGN PATENT DOCUMENTS

| CN | 105775116 A | 7/2016 |
| JP | 2005-253189 | 9/2005 |

(Continued)

OTHER PUBLICATIONS

Japanese Office Action with English Translation of Notification of Reasons for Refusal for Japanese Patent Application No. 2017-199239 dated Jul. 6, 2021, 24 pgs.

*Primary Examiner* — Patricia I Young
(74) *Attorney, Agent, or Firm* — Crowell & Moring, L.L.P.

(57) ABSTRACT

A multi-copter on which a camera with a distance to a focal plane where the camera is in focus fixed at d is mounted detects a position of an inspection overhead line when moving to an image capture start point above the inspection overhead line, and moves to a shooting end point immediately above the inspection overhead line while capturing images of the inspection overhead line at the lower side using the camera while keeping an altitude difference d with the inspection overhead line.

5 Claims, 4 Drawing Sheets

(56) References Cited

U.S. PATENT DOCUMENTS

2018/0280780 A1* 10/2018 Nakao ................... B64C 39/024
2018/0373136 A1* 12/2018 Rozenberg ............. B64D 47/08
2019/0094149 A1* 3/2019 Troy ................... G01M 5/0008

FOREIGN PATENT DOCUMENTS

| | | |
|---|---|---|
| JP | 2005-253189 A | 9/2005 |
| JP | 2017-5978 A | 1/2017 |
| JP | 2017-011358 A | 1/2017 |
| JP | 2017-077080 A | 4/2017 |
| JP | 2017-099226 A | 6/2017 |
| JP | 2017-135943 A | 8/2017 |
| JP | 2017-173238 A | 9/2017 |
| JP | 2017-529710 A | 10/2017 |
| JP | 2018-114807 A | 7/2018 |
| KR | 101735743 B1 | 5/2017 |
| WO | WO 2017/066927 A1 | 4/2017 |
| WO | WO 2018/138942 A1 | 8/2018 |

* cited by examiner

OVERHEAD LINE IMAGE CAPTURING SYSTEM AND OVERHEAD LINE IMAGE CAPTURING METHOD

RELATED APPLICATIONS

The present application claims priority to Japanese Patent Appln. No. 2017-199239, filed Oct. 13, 2017, the entire disclosure of which is hereby incorporated by reference.

BACKGROUND

The present application relates to a technique of capturing images of an overhead line such as a power line.

DESCRIPTION OF THE RELATED ART

As a technique of capturing images of an overhead line (also known as shooting an overhead line), there is known a technique of using a camera mounted on an unmanned aerial vehicle such as an unmanned helicopter to capture images of an overhead line at a high altitude from above and analyzing the captured image to detect an abnormality of the overhead line (for example, JP 2005-253189 A).

SUMMARY

When using a camera mounted on an unmanned aerial vehicle to capture images of an overhead line at a high altitude, it is necessary to keep a distance of several meters or more between the unmanned aerial vehicle and the overhead line in terms of a safety measure against shaking of the overhead line caused by a gust, and thus, the overhead line is observed in a thin line shape as viewed from the camera.

Thus, even when using an autofocus function of a camera to focus the camera on the overhead line, the autofocus function causes focus with a background object of the overhead line instead of the overhead line such that it is difficult to favorably capture an image of the overhead line in some cases.

Therefore, an object of the present disclosure is to capture an image, in focus, of an overhead line using a camera mounted on an unmanned aerial vehicle.

In order to achieve the above object, the present disclosure provides an overhead line image capturing system that captures images of an overhead line. The overhead line image capturing system may include: an unmanned aerial vehicle; a camera mounted on the unmanned aerial vehicle; an overhead line detection unit configured to detect an overhead line; and a control unit that is mounted on the unmanned aerial vehicle and that is configured to automatically navigate the unmanned aerial vehicle. Here, it is possible to fix a distance to a focal plane where the camera is in focus, and the control unit is configured to automatically navigate the unmanned aerial vehicle so as to move along the overhead line while keeping the distance with respect to the overhead line detected by an overhead line detection unit to be constant at a predetermined distance when shooting the overhead line.

In some implementations, such an overhead line image capturing system may be configured such that the control unit automatically navigates the unmanned aerial vehicle so as to move along the overhead line immediately above the overhead line while keeping a distance with respect to the overhead line whose position has been detected by the overhead line detection unit to be constant at the predetermined distance when shooting the overhead line.

In some implementations, it is desirable to set the distance with respect to the focal plane where the camera is in focus to the same distance as the predetermined distance during capturing images of the overhead line.

In addition, the above overhead line image capturing system may be configured such that the unmanned aerial vehicle is provided with a gimbal capable of changing an orientation of the camera, and the control unit is configured of cause the gimbal to change the orientation of the camera so that the overhead line whose position has been detected by the overhead line detection unit is included in an image capturing range of the camera when capturing images of the overhead line.

In addition, the unmanned aerial vehicle may be a multi-copter in the above overhead line image capturing system.

In addition, the present disclosure provides an overhead line image capturing method for capturing images of an overhead line using an unmanned aerial vehicle in order to achieve the above object. Here, a camera, an overhead line detection unit that is configured to detect an overhead line, and a control unit that is configured to automatically navigate the unmanned aerial vehicle are mounted on the unmanned aerial vehicle. The overhead line image capturing method may include: a first step of fixing a distance to a focal plane where the camera is in focus; and a second step of causing the control unit to automatically navigate the unmanned aerial vehicle so as to move along the overhead line while keeping a distance with respect to the overhead line detected by the overhead line detection unit at a predetermined distance, and capturing images of the overhead line using the camera whose distance to the focal plane is fixed.

Here, such an overhead line image capturing method may be configured such that the distance to the focal plane where the camera is in focus is set to the same distance as the predetermined distance in the first step, and the control unit is configured to automatically navigate the unmanned aerial vehicle so as to move along the overhead line immediately above the overhead line while keeping a distance with respect to the overhead line whose position has been detected by the overhead line detection unit to be constant at the predetermined distance in the second step.

In implementations of the overhead line image capturing system and overhead line image capturing method as described above, it is possible to automatically navigate the unmanned aerial vehicle so as to move along the overhead line while keeping the distance with respect to the overhead line to be constant at the predetermined distance, and to capture images of the overhead line using the camera that is mounted on the unmanned aerial vehicle and has the distance to the focal plane fixed at the distance where the overhead line is in focus at the time of capturing images from a position away from the overhead line by the predetermined distance.

Accordingly, it is possible to capture a favorable image in focus on the overhead line using the camera mounted on the unmanned aerial vehicle.

As described above, in implementations of the present disclosure, it is possible to capture an image in focus of the overhead line using a camera mounted on an unmanned aerial vehicle.

DETAILED DESCRIPTION OF THE DRAWINGS

Figure 1:
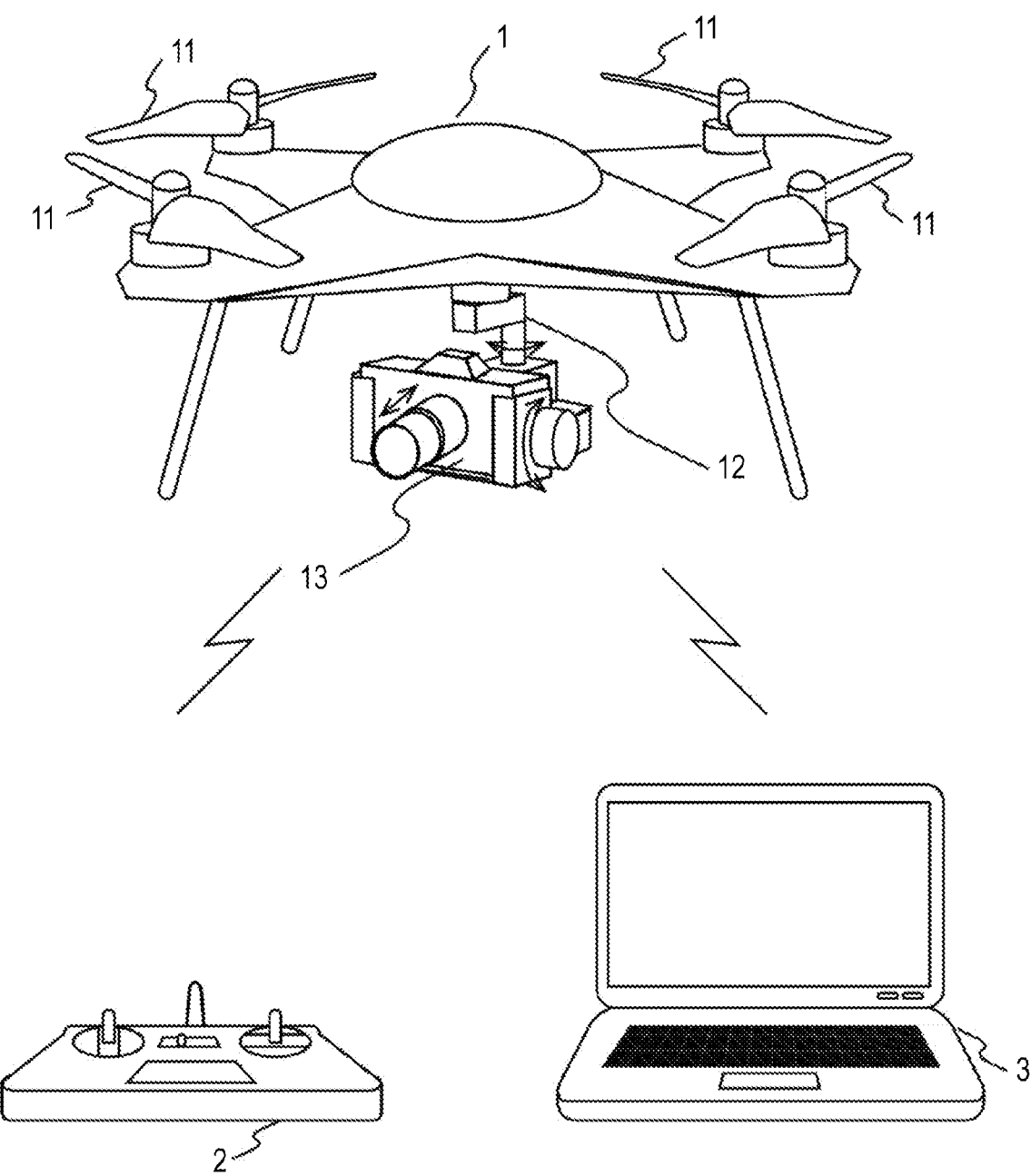
FIG. 1 is a view illustrating a configuration of an overhead line inspection system.

FIG. 1 illustrates a configuration of one implementation of an overhead line inspection system.

As illustrated in FIG. 1, the overhead line inspection system includes: a multi-copter 1 called as a propositional control system, a ground control station (GCS), or the like; a remote control device 2 which performs wireless remote control of the multi-copter 1; and a data processing device 3 which is a computer.

In addition, the multi-copter 1 is an unmanned aerial vehicle including four rotors 11, a gimbal 12 connected to a lower part of the multi-copter 1, and a camera 13 for overhead line image capturing that is supported by the gimbal 12 such that the orientation thereof is variable about three axes. Here, the camera 13 is the camera 13 having an autofocus function capable of selectively setting whether to operate. It is possible to fix a distance from the camera 13 to a focal plane where the camera 13 is in focus to a value that has been set manually or the like when the autofocus function is turned off.

Figure 2:
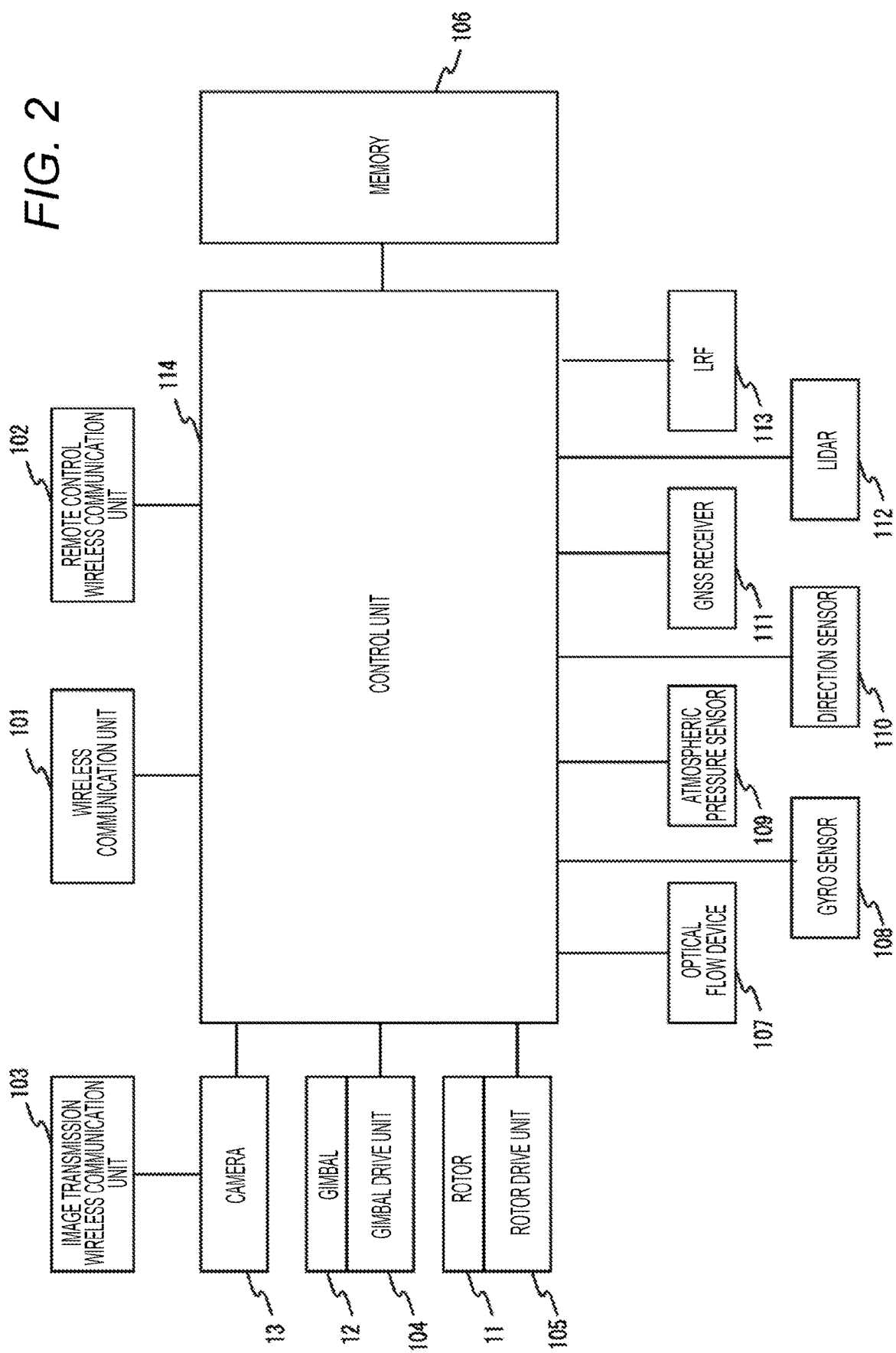
FIG. 2 is a diagram illustrating a functional configuration of a multi-copter.

Next, FIG. 2 illustrates a functional configuration of the multi-copter 1.

As illustrated in FIG. 2, the multi-copter 1 includes: a wireless communication unit 101 which performs wireless communication with the data processing device 3; a remote control wireless communication unit 102 which receives a remote control signal from the remote control device 2; and an image transmission wireless communication unit 103 which wirelessly transmits an image captured by the camera 13 to the data processing device 3.

The multi-copter 1 further includes: a gimbal drive unit 104 which drives the gimbal 12 to set an orientation of the camera 13; a rotor drive unit 105 which drives the rotors 11 to rotate; a memory 106; an optical flow device 107 which captures images outside of the multi-copter 1 and detects movement of the multi-copter 1 with respect to an external object from a captured image; a gyro sensor 108 which detects angular velocity of the multi-copter 1; an atmospheric pressure sensor 109 which detects atmospheric pressure; a direction sensor 110 which detects a direction; a global navigation satellite system (GNSS) receiver 111 which calculates a current position by satellite positioning using a satellite; a light detection and ranging (LIDAR) 112 which causes a laser beam to be reflected to a lower side of the multi-copter 1 to measure the three-dimensional position of an object below the multi-copter 1; an laser range finder (LRF) 113 which causes a laser beam to be reflected to the lower side of the multi-copter 1 to measure a distance to an object below the multi-copter 1; and a control unit 114 which controls each unit of the multi-copter 1. The control unit 114 may include a microcontroller, central processing unit (CPU), or any other type of hardware processor that is able to read and execute instructions stored in the memory 106 and/or stored in another other storage of the multi-copter 1.

In such a configuration of the multi-copter 1, the control unit 114 causes the rotor drive unit 105 to drive the rotor 11 to rotate such that the multi-copter 1 flies at required posture, altitude, and speed using detection results of the optical flow device 107, the gyro sensor 108, the atmospheric pressure sensor 109, and the direction sensor 110.

In addition, the control unit 114 stores flight data transferred from the data processing device 3 in the memory 106 when the wireless communication unit 101 receives an instruction to register the flight data from the data processing device 3.

Here, the data processing device 3 includes a wireless communication device that performs wireless communication with the wireless communication unit 101 of the multi-copter 1, and transmits the instruction on registration of flight data and flight data to the multi-copter 1 via the wireless communication.

In addition, as such flight data, an operator uses the data processing device 3 to define an image capturing start point and an image capturing end point and create flight data including three-dimensional coordinate data of the image capturing start point and three-dimensional coordinate data of the image capturing end point according to a section for shooting an overhead line for inspection, while utilizing map data stored in the data processing device 3.

Hereinafter, an operation of capturing images of an overhead line in the overhead line inspection system will be described.

First, the overhead line image capturing operation will be described by exemplifying a case of inspecting the uppermost overhead line among overhead lines hung between overhead line supports.

Figure 3A:
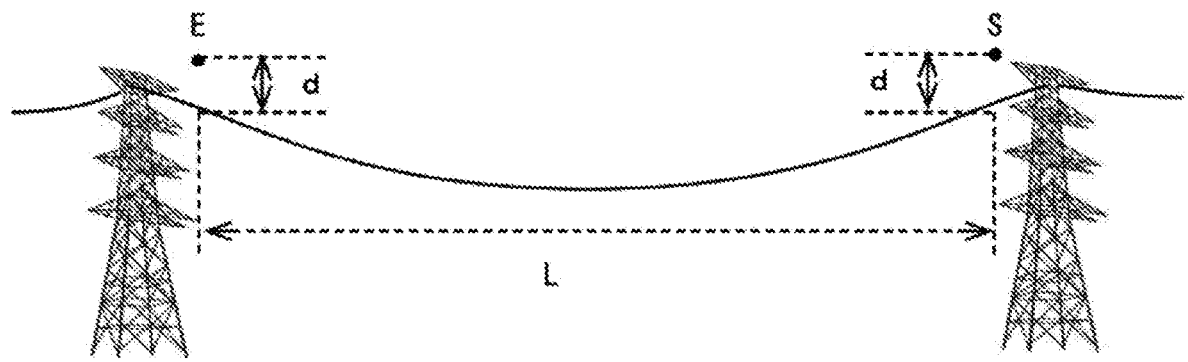
FIGS. 3A to 3C are views illustrating image capturing operations.

In this case, an overhead line to be inspected is set as an inspection overhead line, and, as illustrated in FIG. 3A, the operator sets a position above the inspection overhead line, by a predetermined distance d, immediately above a position which is one end of the inspection overhead line of a section L to captures images of the inspection overhead line as an image capturing start point S, sets a position of the inspection overhead line above the inspection overhead line, by the predetermined distance d, immediately above a position which is an end opposite to the image capturing start point S in the section L to capture images of the inspection overhead line as an image capturing end point E, creates flight data including three-dimensional coordinate data of the image capturing start point S and the image capturing end point E and stores the data in the memory 106 of the multi-copter 1 as described above.

Then, when the flight data is stored in the memory 106 of the multi-copter 1, the operator turns off the autofocus function of the camera 13 of the multi-copter 1 before starting flight of the multi-copter 1, and sets the distance from the camera 13 to the focal plane where the camera 13 is in focus to the above-described distance d manually or the like.

Then, the operator causes the data processing device 3 to instruct the control unit 114 of the multi-copter 1 to start shooting flight based on the flight data via wireless communication.

On the other hand, the control unit 114 of the multi-copter 1, which has been instructed to start the image capturing flight based on the flight data, starts the following image capturing flight control process.

Figure 4:
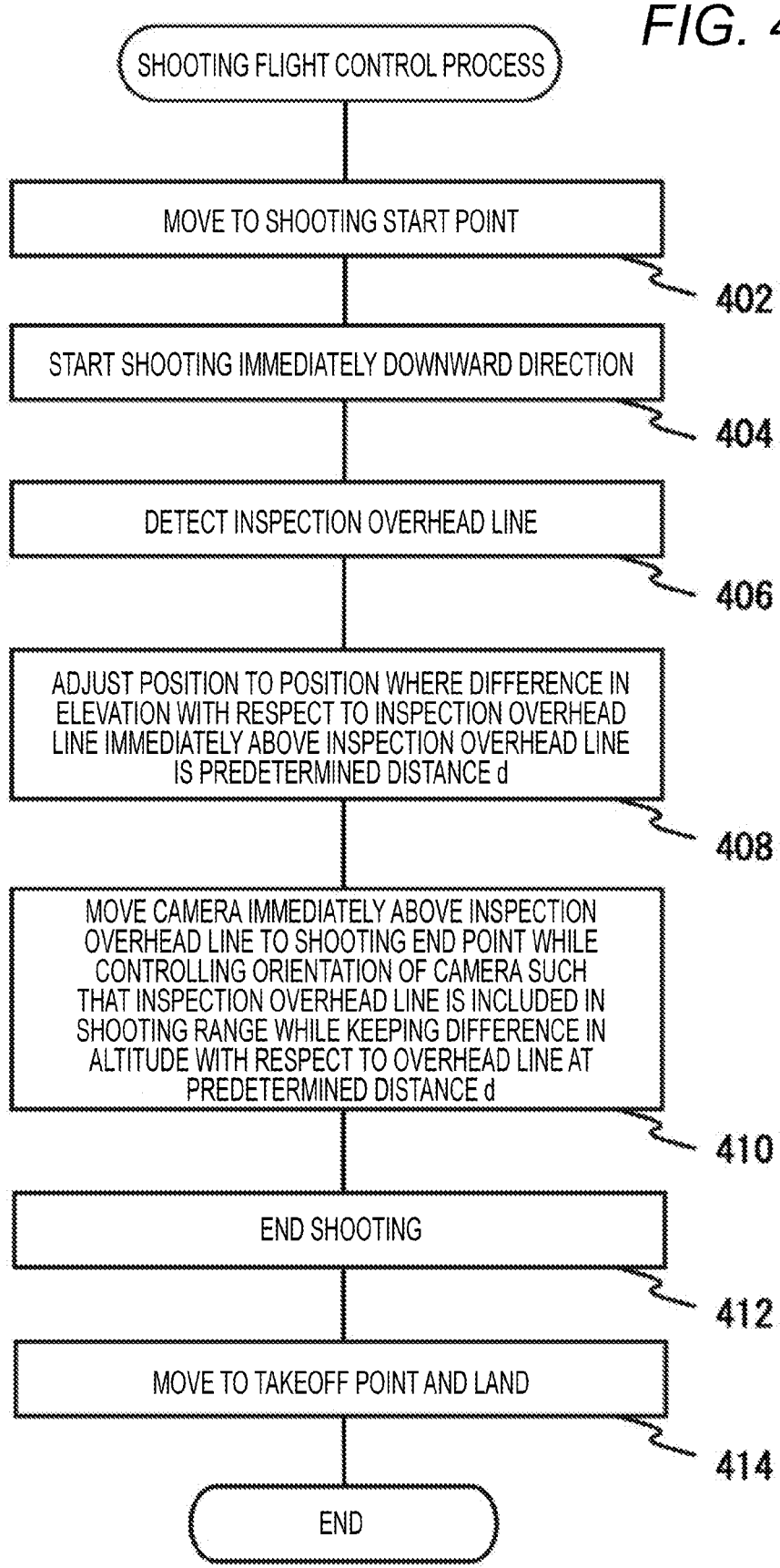
FIG. 4 is a flowchart illustrating a image capturing flight control process.

FIG. 4 illustrates a procedure of this image capturing flight control process.

As illustrated in FIG. 4, in the image capturing flight control process, the control unit 114 of the multi-copter 1 first starts the flight of the multi-copter 1, and moves the multi-copter 1 to a position indicated by the three-dimensional coordinate data of the image capturing start point of the flight data based on a current position of the multi-copter 1 calculated by the GNSS receiver 111 (Step 402).

Then, the control unit 114 controls the gimbal 12 to set the camera 13 so as to capture images of an immediately downward direction, starts the image capture of the camera 13, and starts to transfer of an image captured by the camera 13 to the data processing device 3 by wireless communication using the image transmission wireless communication unit 103 and recording of the image in the memory 106 (Step 404).

Here, the data processing device 3 displays and stores the image transferred from the multi-copter 1.

Next, a position of the inspection overhead line below the multi-copter 1 and a distance to the inspection overhead line are detected using the LIDAR 112 and the LRF 113 (Step 406).

Here, the detection of the inspection overhead line may be performed such that an object below and closest to the multi-copter 1 is detected as the inspection overhead line, or that the image captured by the camera 13 is image-recognized to detect the inspection overhead line.

Next, the position of the multi-copter 1 is adjusted to a position immediately above the detected inspection overhead line by the distance d from the inspection overhead line (Step 408).

Next, the control unit 114 of the multi-copter 1 adjusts an altitude such that a difference in elevation with respect to the inspection overhead line is kept at the distanced while using the LIDAR 112 and the LRF 113 to detect a distance in an elevation direction the inspection overhead line, and moves the multi-copter 1 while controlling the orientation of the camera 13 so that the inspection overhead line is included in an image capture range of the camera 13 immediately above the overhead line at predetermined constant speed to a position indicated by the three-dimensional coordinate data of the image capture end point of the flight data (Step 410).

Here, the movement to the position indicated by the three-dimensional coordinate data of the shooting end point is performed by controlling the multi-copter 1 so as to move immediately above the overhead line according to the position of the overhead line detected by the image recognition using the LIDAR 112, the LRF 113, and the camera 13 regarding longitude and latitude directions. Meanwhile, the movement to the position indicated by the three-dimensional coordinate data of the image capture end point may be simply performed to linearly advance toward the position indicated by the three-dimensional coordinate data of the image capture end point.

In some implementations, control of the orientation of the camera 13 is performed so that the inspected overhead line is included in the image capture range of the camera 13 by controlling the orientation of the camera 13 using the gimbal 12 so that the position of the overhead line detected by the image recognition using the LIDAR 112, the LRF 113, and the camera 13 is included in the image capture range of the camera 13.

When the multi-copter 1 has been moved to the position indicated by the three-dimensional coordinate data of the image capture end point, the image capturing of the camera 13 is ended (Step 412), the multi-copter 1 lands on a takeoff point (Step 414), and the image capture flight control process is ended.

The image capture flight control process performed by the control unit 114 of the multi-copter 1 has been described above.

Figure 3B:
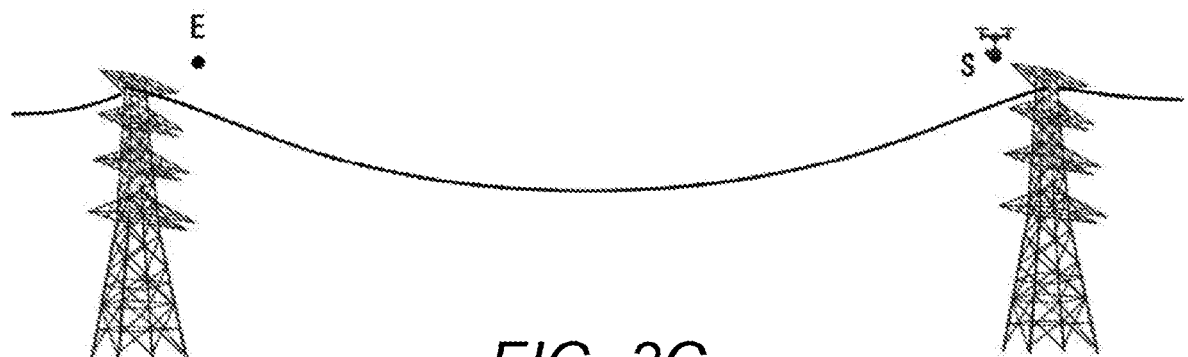
Figure 3C:
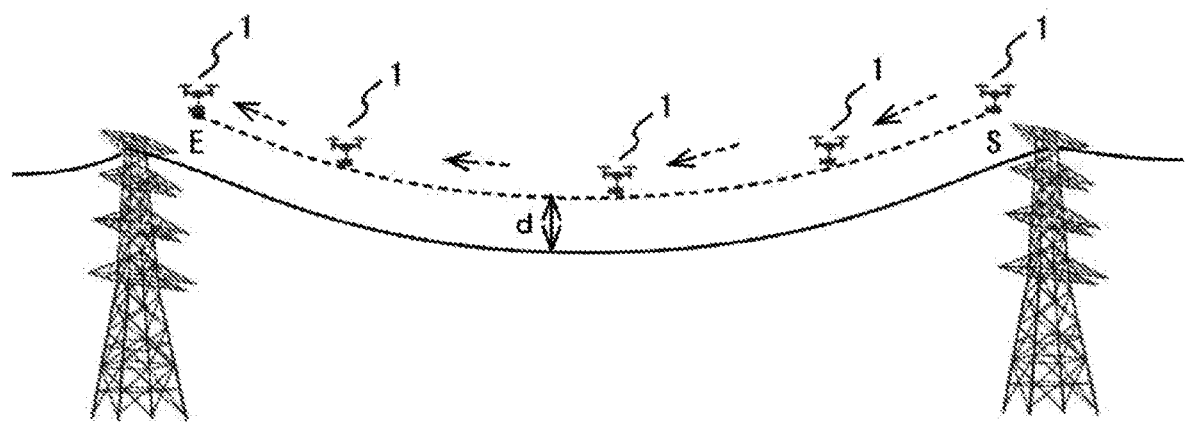

According to such an image capture flight control process, as illustrated in FIG. 3B, the multi-copter 1 first moves to the position above the inspection overhead line, by the predetermined distance d, immediately above the position on the inspection overhead line in the vicinity of the image capture start point S and starts capturing images in the immediately downward direction as illustrated in FIG. 3B. Then, as illustrated in FIG. 3C, the multi-copter 1 moves immediately above the inspection overhead line to the image capture end point E while capturing images of the downward inspection overhead line using the camera 13 while keeping the altitude difference with respect to the inspection overhead line at the distance d.

Here, the distance to the focal plane where the camera 13 is in focus is fixed at the distance d, and the distance from the camera 13 to the inspection overhead line is kept at the distance d during a period of movement from the image capture start point S to the image capture end point E, and thus, it is possible to perform favorable shooting in focus on the inspection overhead line with the above-described shooting flight control process.

Incidentally, the presence or absence of an abnormality of the overhead line is detected by analyzing the image shot by the camera 13 and transferred to the data processing device 3 by the above-described shooting flight control process or the image recorded in the memory 106 using the data processing device 3 or another device.

Above, the overhead line image capturing operation has been described by exemplifying the case of inspecting the uppermost overhead line among the overhead lines hung between the overhead line supports as above, but similar implementations can be similarly applied even in a case of inspecting overhead lines other than the uppermost one overhead line.

That is, even in the case where one overhead line to be inspected is not the uppermost overhead line, an image capturing operation similar to the image capturing operation of the uppermost one overhead line may be performed if there is a sufficient distance between the overhead line and an overhead line above the overhead line.

In addition, if there is no sufficient distance between one overhead line to be inspected and an overhead line above the one overhead line, the image capturing of the inspection overhead line may be performed while controlling the movement of the multi-copter 1 such that the multi-copter 1 moves along a line that is separated from the inspection overhead line in parallel by the distance d diagonally above the inspection overhead line, the line separated from other overhead lines by the distance d or more.

In addition, when a plurality of overhead lines stretched side by side in the horizontal direction at the uppermost position is simultaneously captured as inspection overhead lines among the overhead lines hung between the supports, the image capturing may be performed so that each inspection overhead line is included in the shooting range of the camera 13 while controlling the movement of the multi-copter 1 such that the multi-copter 1 moves along a second line where an altitude difference from a first line becomes the distance d, the second line immediately above the first line passing through the center of the plurality of inspection overhead lines in the horizontal direction.

In addition, when a plurality of overhead lines stretched side by side in the vertical direction is simultaneously captured as inspection overhead lines, the distance from the camera 13 to the focal plane where the camera 13 is in focus may be set to a distance suitable for capturing images of each inspection overhead line by causing the camera 13 to face downward from a position separated from the uppermost inspection overhead line in the immediately upward direction by the distance d, that is, a distance at which each inspection overhead line is in focus, and the image capturing may be performed so that each inspection overhead line is included in the image capturing range of the camera 13 while controlling the movement of the multi-copter 1 such that the multi-copter 1 moves along a line obliquely above the uppermost inspection overhead line separated from the inspection overhead line by the distance d.

In addition, the above implementations can be similarly applied even in the case of image capturing an overhead line from the side or from below by performing control to capture images of the overhead line while moving the multi-copter 1 on a line separated from the overhead line by a predetermined distance laterally or downwardly.

It is therefore intended that the foregoing detailed description be regarded as illustrative rather than limiting, and that it be understood that it is the following claims, including all equivalents, that are intended to define the spirit and scope of this disclosure.

What is claimed is:

1. An unmanned aerial vehicle configured to capture images of an overhead line, the unmanned aerial vehicle comprising:
   a light detection and ranging (LIDAR) system;
   a laser range finder (LRF);
   a camera where a distance to a focal point where the camera is in focus is Fixable;
   a gimble configured to change an orientation of the camera; and
   a hardware controller comprising a processor that is mounted on the unmanned aerial vehicle and that is configured to:
   detect an overhead line using the LIDAR system and the laser range finder;
   automatically navigate the unmanned aerial vehicle to a position indicated by three-dimensional coordinate data;
   control the gimble to set the camera so as to capture images in an immediately downward direction;
   automatically navigate the unmanned aerial vehicle so as to move along the overhead line at a constant speed between two adjacent towers while keeping a distance with respect to the overhead line detected by the controller to be constant at a predetermined distance above the overhead line as measured by the LIDAR system and the laser range finder while capturing images of the overhead line between two adjacent towers with the camera.

2. The overhead line image capturing system according to claim 1, wherein the unmanned aerial vehicle is a multi-copter.

3. The overhead line image capturing system according to claim 1, wherein the distance to the focal plane where the camera is in focus is set to a distance equal to the predetermined distance when capturing images of the overhead line.

4. An overhead line image capturing method for capturing images of an overhead line using an unmanned aerial vehicle,
   the unmanned aerial vehicle having a light detection and ranging (LIDAR) system, a laser range finder (LRF), a camera, a gimble configured to change an orientation of the camera, and a hardware controller comprising a processor that is configured to detect an overhead line and to automatically navigate the unmanned aerial vehicle mounted thereon,
   the overhead line shooting method comprising:
   fixing, with the processor, a distance to a focal plane where the camera is in focus;
   detecting, with the processor, an overhead line using the LIDAR system and the laser range finder;
   automatically navigating, with the processor, the unmanned aerial vehicle to a position indicated by three-dimensional coordinate data;
   controlling, with the processor, the gimble to set the camera so as to capture images in an immediately downward direction;
   automatically navigating, with the processor, the unmanned aerial vehicle so as to move along the overhead line at a constant speed between two adjacent towers while keeping a distance with respect to the overhead line detected by the controller to be constant at a predetermined distance above the overhead line as measured by the LIDAR system and the laser range finder while capturing images of the overhead line between two adjacent towers with the camera.

5. The overhead line shooting method according to claim 4, wherein: the distance to the focal plane where the camera is in focus is set to the same distance as the predetermined distance.

* * * * *